Dec. 29, 1953     R. A. SPENGLER     2,664,107
PILOT OPERATED TIME CONTROLLED GATE VALVE
Filed June 26, 1948
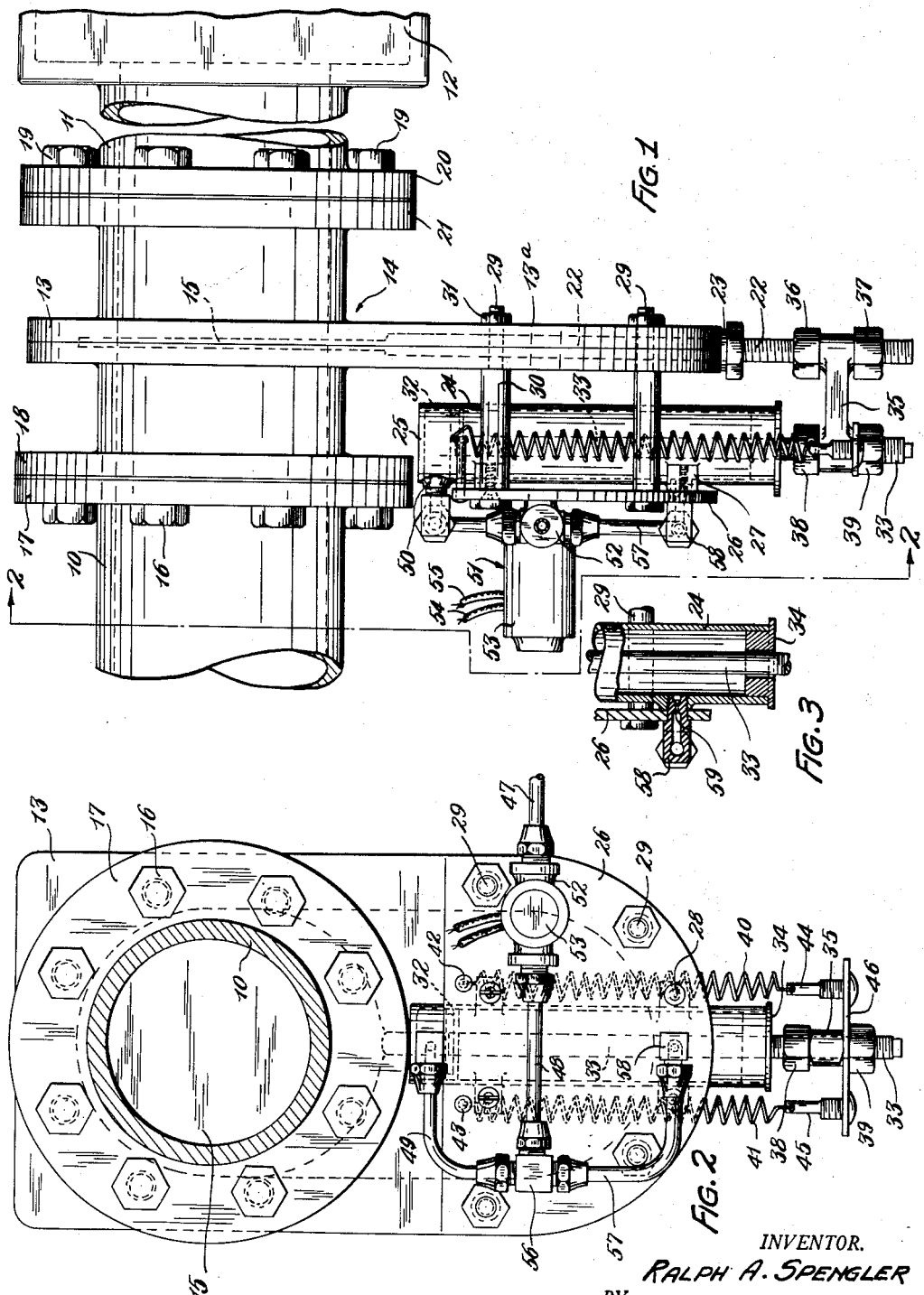
INVENTOR.
RALPH A. SPENGLER
BY Hudson, Boughton,
Williams, David & Hoffmann
ATTORNEYS Patented Dec. 29, 1953

2,664,107

UNITED STATES PATENT OFFICE 2,664,107

PILOT OPERATED TIME CONTROLLED GATE VALVE

Ralph A. Spengler, Cleveland, Ohio

Application June 26, 1948, Serial No. 35,333

6 Claims. (Cl. 137—657)

1

This invention relates to valves and to actuating mechanism therefor. More particularly, the invention relates to slide gate valves and to novel mechanism for actuating such valves.

An object of the invention is to provide an improved slide gate valve for controlling the flow of air, gas, or other fluid through a conduit, the valve being provided with an actuating mechanism such that the opening movement of the valve is cushioned and the valve is retained open for a predetermined time interval after the actuating mechanism has been conditioned to effect closing thereof.

Another object of the invention is to provide an improved actuating mechanism for a valve, which mechanism comprises fluid pressure operating means for effecting opening of the valve so constructed and arranged that the opening of the valve is cushioned, thereby reducing objectionable shocks and noise.

A further object of the invention is the provision of an improved actuating mechanism of the type mentioned in the preceding object and further comprising means for normally biasing the valve to closed position, the mechanism being so constructed and arranged that the valve is retained open for a predetermined time interval after the actuating mechanism for the valve has been conditioned to effect closing thereof.

An additional object of the invention is the provision of an improved valve actuating mechanism of the type defined in the two preceding objects, which is capable of operation from a remote point and is adapted to be readily attached to a valve in place in a conduit without the necessity of altering or removing the valve.

The invention further resides in certain novel features of construction and combination and arrangements of parts, and further objects and advantages thereof will be apparent to those skilled in the art to which it pertains from the following description of the present preferred embodiment thereof, described with reference to the accompanying drawings in which similar reference characters represent corresponding parts in the several views and in which:

Fig. 1 is a side elevational view of a slide gate valve and operating mechanism therefor constructed in accordance with this invention;

Fig. 2 is a front elevational view of the valve and actuating mechanism shown in Fig. 1, with the conduit controlled by the valve being shown in section, the view being taken substantially on the line 2—2 of Fig. 1 and looking in the direction indicated by the arrows; and,

2

Fig. 3 is a fragmentary sectional view of the lower portion of the cylinder of the improved valve actuating mechanism illustrating the piston rod guide and the restricted orifice provided in the lower fluid admission port of the cylinder.

In Fig. 1 of the drawing, the reference numerals 10 and 11 indicate portions of a conduit for fluid, such as gas, air, or the like, the flow of which is to be controlled. For example, the conduit may be employed for supplying air to a fuel burner such as a burner employing powdered coal. As is well known in such devices, the powdered coal or other fuel is fed into a chamber 12 with which the conduit, such as 10, 11, is in communication and air under pressure flowing through the said conduit transports the powdered coal from chamber 12 to the burner. In such an installation it is desirable that the flow of air through the conduit be controllable in accordance with the operation of the burner so that flow of air therethrough is terminated when the burner operation is terminated. It is further desirable that this flow of air through the conduit continue for a certain time interval after the supply of fuel to the chamber 12 is interrupted so as to sweep all particles of fuel out of the chamber and from the conduit, such as 10, 11. Consequently, the means for controlling the flow of air through the conduit 10, 11 should be such that termination of the flow is delayed for a short time after the mechanism, such as a thermostatically controlled switch, operates to effect termination of the supply of the powdered fuel. In addition to coal burners, similar problems are encountered in the control of fluids to other burners and for other purposes and, consequently, while this invention is particularly useful for controlling the flow of air to a coal burner, it will be understood that the invention is not limited to such a use but may be employed wherever like problems arise.

In accordance with this invention, control of air or other fluid through the conduit 10, 11 is effected by interposing between the portions 10 and 11 of the conduit a chamber 13 of a slide gate valve, generally designated 14. This gate valve comprises a plate-like valve member 15 which is slidingly supported within the chamber and attached housing 13a for movement transversely of the chamber and hence transversely of the conduit. The connection of the valve chamber to the conduit is effected, as is well known in the art, by means of suitable nuts and bolts, such as 16, which pass through cooperating flanges 17, 18 provided upon the portion 19 of the conduit and the adjacent portion of the valve chamber; similar nuts and bolts 19 likewise join together cooperating flanges 20 and 21 of the conduit portion 11 and valve chamber 13. The housing 13a for the sliding gate or valve member 15 is elongated sufficiently to accommodate the gate member 15 in its fully open position, as well be seen in Figs. 1 and 2 and is as well known in the art. Connected with the edge of the valve gate or member 15, and extending radially therefrom, is an actuating rod 22 which extends outwardly of the housing 13 through a sealing gland 23 which cooperates with the rod and the housing to effect a fluid-tight seal.

The gate valve just described, which is of conventional construction, is adapted to be operated by the novel mechanism of this invention, the latter being readily connected to the valve to effect operation of the latter without removing the valve from the conduit or altering the valve mechanism. This novel operating mechanism comprises a cylinder 24 which has one end 25 thereof closed, this end if desired being made integral with the side walls of the cylinder. The cylinder is connected with a supporting plate 26 by means of lugs, such as 27, which may be welded to the cylinder and are provided with threaded openings for receiving machine screws, such as 28, which connect the plate 26 to the lugs. The plate 26 is in turn connected with the housing 13a of the valve 14 by a plurality of bolts, such as 29, which pass through the plate 26 and the housing 13a. The plate is spaced from the housing 13 by sleeves, such as 30, which surround the bolts 29. The outer ends of the bolts 29 are threaded and provided with nuts, such as 31, so that the cylinder may be readily connected with the housing 13 or detached therefrom. Alternatively, the bolts 29 may simply have an enlarged cylindrical shank portion between the plate 26 and the housing 13 for this purpose, to effect the necessary spacing in which event both reduced ends of the bolts would be threaded for the reception of nuts. It will be observed that the bolts, such as 29, pass through the flange portion of the housing 13a so that they do not interfere with the operation of the valve gate or plate 15 nor communicate with the opening for this member within the housing.

A piston 32 is slidably mounted within the cylinder 24 and is provided with a piston rod 33 which extends through a guide member 34 mounted in the open end of the cylinder, the piston and/or cylinder being so constructed that there is a gradual escape of operating fluid from the region between the closed end of the cylinder and the piston for a purpose hereinafter set forth. The guide member 34 has a bore therethrough of a diameter such as to provide a sliding guide for the piston rod with a slight clearance thereabout and no packing means is provided about the rod at this point so that the rod and guide member provide a restricted orifice for the lower portion of the cylinder for a purpose hereinafter mentioned.

The lower ends of the valve actuating rod 22 and the piston rod 33 are rigidly connected together, this connection being effected in any desired manner but preferably being provided by a link 35 which has enlarged bosses at the ends with openings therethrough for receiving the rods 22 and 33. The link 35 is held in adjusted position on the rods by nuts, such as 36, 37, 38, 39 screwed upon the threaded lower ends of the rods 22 and 33, respectively, and clamping the opposite sides of the bosses of the link therebetween. It will be seen, therefore, that the valve member 15 and the piston 32 are connected for movement together.

The valve member 15 is preferably biased to closed position and this also normally disposes the piston 32 adjacent the closed end 25 of the cylinder 24. This biasing means may be of any desired construction but is here shown as comprising a pair of tension springs 40, 41, the upper ends of which are connected with pins or brackets 42, 43 carried by the plate 26 adjacent the upper end of the latter. The lower ends of the springs 40, 41 are respectively connected with adjusting members 44 and 45 which are, in turn, connected with the lower end of the piston rod 33. In the illustrated embodiment, the members 44, 45 are shown as having threaded portions engaging in suitably threaded openings in a plate 46 which is connected with the piston rod 33 between the link 35 and one of the nuts, such as 39. The construction is such that the springs 40, 41 normally urge the piston 32 to its uppermost position and the valve member 15 to its closed position, the force exerted by the springs being adjustable by screwing the members 44, 45 greater or lesser distances through the plate 46. As here shown, the springs 40, 41 hook into openings in the ends of the adjusting members 44, 45. Hence, in effecting the aforementioned adjustment, the springs may be unhooked from the members 44, 45 while the latter are rotated and the springs thereafter reconnected to the adjusting members 44, 45. The force exerted by the springs may also be varied by adjusting the position of link 35 relative to the rods 22 and 33, this mode of adjustment being effected by screwing the nuts 36, 37, 38 and 39 to appropriate positions on the rods 22 and 33.

The valve member 15 is adapted to be actuated to open position by fluid pressure such as compressed air, or the like, which is supplied from a source, not shown, through the conduits or pipes 47, 48 and 49, the latter being connected to a port 50 in the cylinder 24 adjacent the closed end 25 and above the piston 32 when the latter is in its upper extreme position corresponding with the closed position of the valve 15. Interposed between the conduits 47 and 48 is a control member, generally designated 51, for controlling the application of fluid pressure to the cylinder. In the illustrated embodiment, this control member comprises a valve 52 which is operated by a solenoid 53, the conductors 54 and 55 of the latter being connected with any suitable electrical control, such as a thermostat, relay, or the like, so that the valve 52 is operated in accordance with a condition, such as room temperature, furnace operating conditions or the like. The construction is such that when the solenoid is deenergized the valve 52 is closed and when the solenoid 53 is energized the control valve 52 is opened. Opening of the valve 52 supplies fluid under pressure to the cylinder 25 adjacent the closed end of the latter and at the rear of piston 32 so that the latter is moved through the cylinder, thereby opening the valve member 15 to control the flow of fluid through the conduits 10 and 11.

This application of fluid pressure through the port 50 would tend to produce relatively rapid opening of the valve 15 and hence the latter would strike the bottom of its housing 13a with considerable force, thus imposing stresses in the mechanism and producing undesirable noise. In order to delay the speed of opening and provide a cushioning for the opening movement of the valve, the conduits 48 and 49 are connected together through a T 56 to which one end of a third conduit 57 is also connected. The other end of the conduit 57 communicates with a connecting block 58 which in turn communicates with a port in the side wall of the cylinder 25 intermediate the ends of the latter. As shown in the drawings this port is spaced from the closed end of the cylinder a distance approximately three-fourths of the length of the cylinder, but it will be understood that this distance is not critical and may be varied.

The connecting block 58 is provided with a restricted orifice 59 so that the pressure of the fluid entering the cylinder through this port is less than that entering the top of the cylinder through the port 50. Consequently, the fluid pressure entering through the lower port does not prevent opening of the valve in response to the fluid pressure applied at the rear of the piston but does tend to retard the movement of the piston 32 in a valve opening direction, thus cushioning the movement of the valve, until the latter is substantially open at which time the piston 32 passes the lower orifice so that the fluid pressure supplied through the latter as well as that supplied through the port 50 is effective to complete the opening movement of the valve. After the piston has passed the lower port when moving in the valve opening direction, the springs 40 and 41 will, by virtue of their extension, exert sufficient force to cushion the further movement of the valve.

So long as the control valve 52 remains open, fluid under pressure is supplied to the cylinder 24 thus maintaining valve member 15 open against the force exerted by the springs 40 and 41. When the control valve 52 is closed, however, the valve member 15 is not immediately returned to closed position but, instead, remains in open position for a predetermined time interval after closing of the valve 52. This is due to the fact that the force exerted by the springs 40 and 41 is insufficient to immediately overcome the force exerted upon the piston 32 by the fluid trapped in the cylinder when the control valve 52 is closed. However, this trapped fluid gradually escapes from the space between the closed end of the cylinder and the piston and passes from the cylinder through the restricted opening between the piston rod 33 and the guide member 34. After a portion of the trapped fluid has thus escaped, the springs move the piston 32 and the valve member in the valve closing direction and when the piston 32 has uncovered the lower port in the cylinder the remainder of the fluid trapped therein exhausts through the pipes or conduits 49 and 57 into the lower portion of the cylinder and escapes therefrom through the guide member 34. At this time the restricted orifice 59 enables the fluid in the upper portion of the cylinder to provide a dashpot like action so that the valve member 15 is closed without shock. The duration of the time interval in which the slide valve remains open after the control valve is closed is a function both of the rate of escape of the fluid from the cylinder and the force exerted by the biasing means and may be regulated by varying either the rate of escape of the fluid or the force of the biasing means. In the construction illustrated, the force of the biasing means is varied by adjusting the members 44, 45 and/or by replacing the springs 40 and 41 with others of different strength.

It is believed that the operation of the improved valve operating mechanism will now be readily apparent from the detailed description of its construction. This operation may, however, be briefly summarized as follows:

Let it be assumed that the slide valve 14 is interposed in the air supply duct for a coal burner, or the like, for moving powdered fuel from the chamber 12 to a burner. Let it be further assumed that the controls for such a burner have been energized to place the burner in operation. Powdered fuel will then be supplied, by means not shown, to the chamber 12. Simultaneously therewith a circuit will be closed energizing the solenoid 53 to open the control valve 52 so that fluid pressure flows through the pipes 47 and 48 to the T 56. From the T 56 a portion of the pressure fluid enters the upper portion of the cylinder 24 through the port 50 and a portion of the pressure fluid also enters the cylinder 24 through the lower port, the volume and pressure of the latter portion of the pressure fluid being less than that of the fluid entering through the port 50 due to the restricted orifice 59 associated with the lower port. Consequently, fluid pressure is applied on opposite sides of piston 32 with the pressure in advance of the piston being less than that at the rear of the piston. Therefore, the piston 32 moves downwardly within the cylinder thereby moving the valve member 15 to open position, the movement in this direction being cushioned by the fluid under pressure entering through the lower port of the cylinder.

As the piston moves within the cylinder, the fluid under pressure admitted in advance of the piston exhausts through the restricted orifice provided between the piston rod 33 and the guide member 34, thus providing a retarded, smooth opening of the valve without shocks or vibration. As the slide valve 14 continues to open, the force exerted by the springs 40, 41 increases, and when the piston has passed beyond the lower port, the fluid pressure entering therethrough is added to that entering through the upper port 50 thereby completing the actuation of the piston and hence the opening of the slide valve 14. Consequently, air now flows through the conduits 10, 11 sweeping the powdered fuel from the chamber 12 to the burner, not shown, and this continues so long as the burner remains in operation since the continued energization of the solenoid 53 causes fluid pressure to be maintained within the cylinder holding the piston at its extreme outer or lower position which corresponds to the open position of the slide valve.

When the controls of the stoker are actuated to terminate operation of the latter, the solenoid 53 is deenergized. It is not, however, desirable that the slide valve 14 immediately snap shut since this might result in some of the powdered fuel remaining within the chamber 12 and even within the conduits 10 and 11. Consequently, the closing of the slide valve 14 is delayed after solenoid 53 is deenergized to allow the air flowing through the conduits 10 and 11 to sweep the latter and the chamber 12 clear of fuel or other particles.

When the solenoid 53 is deenergized the supply of pressure fluid to the cylinder 24 is immediately terminated thus trapping a portion of the pressure fluid within the cylinder 24, the pressure of which is greater than the force exerted by the springs 40, 41 so that the piston 32 cannot return to its initial position until a portion of this trapped fluid has escaped about the piston and through the restricted orifice provided between the piston rod 33 and the guide member 34. When, however, a portion of the trapped fluid has thus escaped, the springs 40, 41 begin the movement of the piston 32 back to its initial position, thus moving the valve member 15 in a closing direction. When the piston 32 has moved sufficiently within the cylinder to have passed beyond the lower port, the remaining fluid pressure trapped within the cylinder can now escape through the conduits 49, 57 into the lower portion of the cylinder and thence through the restricted orifice provided in the guide member 34 so that the springs return the valve more rapidly to its closed position. It should be noted, however, that the restriction 59 provided in the connection to the lower port sufficiently retards the escape of the fluid pressure at this time so that the slide valve 15 does not slam shut.

It will now be apparent that the invention provides a simple and efficient actuating mechanism for a slide gate valve which may be readily attached to the valve while in place in a conduit without the necessity of altering the valve or disconnecting it from the conduit. Moreover, this mechanism is compact so that it may be readily installed without interfering with adjacent mechanism.

For the sake of simplicity a housing for the actuating mechanism has been omitted, but it will be readily understood that a suitable cover or housing will normally be provided for such a mechanism to provide an attractive appearance and exclude dust or other foreign material which might interfere with the operation.

It is also apparent that while the invention has been particularly described with reference to its use upon a slide gate valve, such as is employed with coal burners, the slide valve may control the flow of fluids other than air. Moreover, the improved actuating mechanism may be employed for operating valves other than those of the slide type by connecting the piston rod 33 to the valve actuating member through suitable links or levers. Likewise, while springs have been disclosed as the biasing means for the valve and its actuating mechanism, it will be apparent that counterweighted levers or other suitable means may be employed in place thereof. Furthermore, the restricted orifice communicating with the lower port in the cylinder may be made adjustable, if desired, or a sufficient reduction of pressure at this port may be obtained by other means such as substituting for the conduit 57 one of relatively small diameter. Furthermore, in certain instances an opening or openings of sufficient size may be provided in the guide member 34 so that the pressure supplied through the conduit 57 is substantially reduced solely by exhausting through the guide member, thereby eliminating the necessity of a restricted orifice such as 59. It will also be apparent that the control valve 52 may be provided with a manual operating handle instead of a solenoid, if desired.

The above and numerous other modifications and/or adaptations will readily suggest themselves to those skilled in the art and therefore the construction which has been illustrated and described in considerable detail is to be considered only as illustrative of one practical embodiment of the invention and is not to be construed as a limitation thereof.

Having thus described the invention, I claim:

1. An apparatus of the character described comprising a valve chamber adapted to be connected in a conduit for fluid, a valve member slidably mounted in said chamber for movement transversely thereof to control the flow of fluid therethrough, a stationary cylinder having one end closed and the other end open, a piston within said cylinder, a piston rod rigidly connected to said valve member to operate the latter when said piston is moved, a member cooperating with the open end of said cylinder to guide the piston rod and provide a restricted opening about the latter for the passage of a fluid under pressure, means for simultaneously introducing fluid under pressure into said cylinder through two ports spaced longitudinally therealong, one of said ports being adjacent the closed end of the cylinder and the other port being intermediate the open and closed ends of the cylinder so that fluid under pressure is introduced on opposite sides of said piston when the latter is adjacent the closed end of the cylinder with the fluid introduced through the second-mentioned port cushioning the movement of the piston and valve member in the valve opening direction until the piston moves beyond the second-mentioned port whereupon the fluid pressure introduced through both ports operates upon the piston to open the said valve member, means normally biasing said valve member to closed position and said piston to a position adjacent the closed end of said cylinder, the force of said biasing means being insufficient to return said valve member and piston to the last-mentioned positions immediately after the application of fluid pressure to said ports is terminated but being sufficient to return the piston and valve member to their initial positions when a portion of the fluid trapped in said cylinder has escaped through the restricted opening in the guide member, whereby closing of said valve member is delayed a predetermined time interval after the supply of fluid pressure to said cylinder is terminated.

2. An apparatus as defined in claim 1 and further comprising means to adjust the force exerted by said biasing means to thereby regulate the extent of the time interval during which the said valve member is held open after the application of fluid pressure to said cylinder is terminated.

3. An apparatus of the character described comprising a stationary cylinder having one end closed and provided with a first port adjacent the said one end and a second port intermediate its ends, a piston within said cylinder, a piston rod rigidly connected to said piston and extending outwardly of the other end of the cylinder for connection to a member which is to be actuated by movement of the piston, means secured to the cylinder adjacent the said other end thereof guiding the piston rod in its movements and closing the cylinder except for a restricted opening, means normally biasing said piston to a position adjacent the said one end of the cylinder intermediate the said ports, conduit means for simultaneously introducing fluid under pressure into said cylinder through the said ports including means providing a restricted orifice for the introduction of the fluid through said second port thereby cushioning the movement of said piston until it passes the said second port, and valve means for controlling the application of fluid pressure to said conduit means and adapted when in non-operated position to prevent passage of fluid from said conduit means, whereby the said piston remains in operated position until sufficient fluid escapes past said piston to permit the biasing means to move the piston a distance such that the second port is placed in communication with the restricted opening through said piston guide means thereby providing a time interval between the termination of the supply of fluid pressure to the cylinder and the return of the piston to its initial position.

4. An apparatus of the character described comprising a stationary cylinder having one end closed and provided with a first port adjacent said one end and a second port intermediate its ends, a piston within said cylinder, a piston rod rigidly connected to said piston and extending outwardly of the other end of the cylinder for connection to a member which is to be actuated by movement of the piston, means secured to the cylinder adjacent the said other end thereof guiding the piston rod in its movements and closing the cylinder except for a restricted opening, means normally biasing said piston to a position adjacent the said one end of the cylinder intermediate the said ports, conduit means for simultaneously introducing fluid under pressure into said cylinder through the said ports including means providing a restricted orifice for the introduction of the fluid through said second port thereby cushioning the movement of said piston until it passes the said second port, valve means for controlling the application of fluid pressure to said conduit means and adapted when in non-operated position to prevent passage of fluid from said conduit means, whereby the said piston remains in operated position until sufficient fluid escapes past said piston to permit the biasing means to move the piston a distance such that the second port is placed in communication with the restricted opening through said piston guide means thereby providing a time interval between the termination of the supply of fluid pressure to the cylinder and the return of the piston to its initial position, and means to adjust the force exerted by said biasing means to thereby regulate the duration of said time interval.

5. An apparatus of the character described comprising a stationary cylinder having one end closed and provided with a first port adjacent said one end and a second port intermediate its ends, a piston within said cylinder, a piston rod rigidly connected to said piston and extending outwardly of the other end of the cylinder for connection to a member which is to be actuated by movement of the piston, means secured to the cylinder adjacent the said other end thereof guiding the piston rod in its movements and closing the cylinder except for a restricted opening about said piston rod, spring means connected to said piston rod in a manner to normally bias said piston to a position adjacent the said one end of the cylinder intermediate the said ports, conduit means for simultaneously introducing fluid under pressure into said cylinder through the said ports including means providing a restricted orifice for the introduction of fluid through said second port thereby cushioning the movement of said piston until it passes the said second port, and valve means for controlling the application of fluid pressure to said conduit means and adapted when in non-operated position to prevent passage of fluid from said conduit means, whereby the said piston remains in operated position until sufficient fluid escapes past said piston in response to the force exerted by said spring means so that the said piston is moved to a position placing the said second port in communication with the restricted opening through said piston guide means thereby providing a time interval between the termination of the supply of fluid pressure to the cylinder and the return of the piston to its initial position.

6. An apparatus of the character described comprising a stationary cylinder having one end closed and provided with a first port adjacent said one end and a second port intermediate its ends, a piston within said cylinder, a piston rod rigidly connected to said piston and extending outwardly of the other end of the cylinder for connection to a member which is to be actuated by movement of the piston, means secured to the cylinder adjacent the said other end thereof guiding the piston rod in its movements and closing the cylinder except for a restricted opening about said piston rod, spring means exteriorly of said cylinder and connected to said piston rod in a manner to normally bias the said piston to a position intermediate the said ports and adjacent the said one end of the cylinder, conduit means for simultaneously introducing fluid under pressure into said cylinder through the said ports including means providing a restricted orifice for the introduction of the fluid through said second port thereby cushioning the movement of said piston until it passes the said second port, valve means for controlling the application of fluid pressure to said conduit means and adapted when in non-operated position to prevent passage of fluid from said conduit means, whereby the said piston remains in operated position until the force exerted on said piston by said spring means causes sufficient fluid to escape past the piston to allow the latter to place the said second port in communication with the restricted opening through the said piston guide means thereby providing a time interval between the termination of the supply of fluid pressure to the cylinder and the return of the piston to its initial position, and means to adjust the force exerted by said spring means to thereby regulate the duration of said time interval.

RALPH A. SPENGLER.

References Cited in the file of this patent

UNITED STATES PATENTS

| Number | Name | Date |
|---|---|---|
| 540,347 | Baker | June 4, 1895 |
| 885,459 | Engler | Apr. 21, 1908 |
| 1,772,773 | Forman | Aug. 12, 1930 |
| 1,966,608 | Cardwell | July 17, 1934 |
| 2,395,212 | Blanchard | Feb. 19, 1946 |
| 2,456,493 | Drane | Dec. 14, 1948 |

FOREIGN PATENTS

| Number | Country | Date |
|---|---|---|
| 676,340 | Germany | June 1, 1939 |